(12) United States Patent
Kitson et al.

(10) Patent No.: US 8,908,131 B2
(45) Date of Patent: Dec. 9, 2014

(54) CHOLESTERIC REFLECTOR

(75) Inventors: Stephen Kitson, Alveston (GB); Adrian Geisow, Portishead (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 27 days.

(21) Appl. No.: 13/387,101

(22) PCT Filed: Dec. 18, 2009

(86) PCT No.: PCT/US2009/068844
§ 371 (c)(1),
(2), (4) Date: Jan. 25, 2012

(87) PCT Pub. No.: WO2011/075149
PCT Pub. Date: Jun. 23, 2011

(65) Prior Publication Data
US 2012/0120354 A1      May 17, 2012

(51) Int. Cl.
G02F 1/1335    (2006.01)
G02F 1/1347    (2006.01)
G02B 5/30      (2006.01)

(52) U.S. Cl.
CPC ...... *G02F 1/133553* (2013.01); *G02F 1/13473* (2013.01); *G02F 2201/343* (2013.01); *G02B 5/3016* (2013.01)
USPC .......................................... 349/115; 349/127

(58) Field of Classification Search
USPC ....................................................... 349/115
See application file for complete search history.

(56) References Cited

U.S. PATENT DOCUMENTS

| | | | |
|---|---|---|---|
| 6,307,604 B1 * | 10/2001 | Hikmet et al. | 349/71 |
| 6,342,934 B1 | 1/2002 | Kameyama et al. | |
| 6,727,873 B2 * | 4/2004 | Gordon et al. | 345/88 |
| 7,106,297 B2 * | 9/2006 | Shannon et al. | 345/107 |
| 7,110,054 B2 | 9/2006 | Jurg | |
| 7,510,741 B2 | 3/2009 | Pokomy et al. | |
| 2001/0055208 A1 * | 12/2001 | Kimura | 362/260 |
| 2003/0197820 A1 | 10/2003 | Hiji et al. | |
| 2006/0066803 A1 * | 3/2006 | Aylward et al. | 349/158 |
| 2008/0259259 A1 * | 10/2008 | Otake | 349/117 |
| 2009/0140961 A1 | 6/2009 | Geisow et al. | |
| 2009/0284690 A1 * | 11/2009 | Kuo et al. | 349/75 |

OTHER PUBLICATIONS

Sikharulidze, David; "P-166: An Electrophoretic LCD with Selective Reflection"; SID 08 Digest; 2008; pp. 1823-1825.
Wu, H.-M., et al.; "Liquid-crystal alignment of rubbed polyimide films: A microscopic investigation"; Applied Physics B Lasers and Optics; 1996; pp. 613-618; vol. 62; Springer-Verlag.
International Search Report and Written Opinion mailed on Sep. 16, 2010 for International Patent Application No. PCT/US2009/068844 filed on Dec. 18, 2009;11 pages.
European Search Report (extended), Jul. 22, 2014, European Patent Publication No. 2513717.

* cited by examiner

*Primary Examiner* — Edward Glick
*Assistant Examiner* — Alexander Gross (57) ABSTRACT

A cholesteric reflector comprising a substrate and a first cholesteric layer that is disposed over the substrate and reflects a first polarization of light within a design waveband. A second cholesteric layer is disposed over the first cholesteric layer and reflects a second polarization of light within the design waveband.

20 Claims, 6 Drawing Sheets

CHOLESTERIC REFLECTOR

RELATED APPLICATIONS

This application claims priority under 35 U.S.C. 371 to PCT/US2009/068844, entitled "Cholesteric Reflector", filed on Dec. 18, 2009, commonly assigned herewith, and hereby incorporated by reference.

BACKGROUND

Reflective visual displays can be used in a variety of applications including computer monitors, personal digital assistants, watches, and other devices. Reflective displays have a number of advantages over traditional backlit LCD devices, including low power consumption and excellent visibility in sunlight. Ideally, colored reflectors in a reflective visual display would be inexpensive, flexible, and compatible with roll-to-roll processing.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Color selective reflectors reflect one color of light and transmit the other colors. The efficiency of reflection and transmission can both be very high. They are particularly useful in reflective display systems where they are used to generate the color at sub-pixels or as interlayer reflectors in multilayer displays.

Color selective reflectors may use multilayer Bragg coatings. The Bragg coatings are made from alternating layers of two materials with different refractive indices. For example, in order to reflect a particular color the layer thicknesses can be set to a quarter of the wavelength of that color light in each material. This gives a convenient way to engineer the reflectivity characteristics. A variety of other layer configurations and thicknesses could be used to form Bragg coatings. A reflector formed from multilayer Bragg coatings can have very high reflectivity for the designed light band and high transmissivity of out-of-band light.

However, multilayer Bragg coatings may have a number of disadvantages. A first disadvantage is that on the order of 10 pairs of layers are used to form an efficient Bragg coating. Each of these layers is separately coated by sputtering or evaporation under vacuum, which is time consuming and expensive. A second disadvantage is that the resulting layers are typically brittle. Consequently, the reflector coatings can be fragile and unsuitable for use in a flexible display.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

A wave plate or retarder is an optical device which alters the polarization state of light which passes through it. The wave plate works by shifting the phase between the two perpendicular polarization components of the light wave. For example, a wave plate may be a birefringent crystal with a precise thickness and orientation. Light of one polarization passes through the wave plate with a different speed than the polarized light of the perpendicular orientation. Depending on the thickness of the material, the light will emerge from the retarder in a different polarization state. For example, if the thickness of the material is such that a quarter-wavelength phase shift occurs, the retarder is call a quarter wave plate. Similarly, if the retarder induces a half wavelength phase shift, the retarder is called a half wave plate.

Liquid crystals are a state of matter which has properties of both a conventional liquid and a solid crystal. For example, the liquid crystals may flow like a liquid but maintain long range of molecular order reminiscent of a solid crystal. According to one illustrative embodiment, the liquid crystal may be a cholesteric molecule which forms a helical structure. These cholesteric liquid crystals are also known as chiral nematic liquid crystals.

In the specification and appended claims, the term "mesogenic" refers to a rigid, rod-like, moiety of a liquid crystalline molecule. According to one illustrative embodiment, the mesogen may be composed of two or more aromatic and aliphatic compounds connected in one direction.

According to one illustrative embodiment, self organizing reactive mesogens can be used to form a spectrally selective reflector which is both inexpensive and flexible. One example of a self organizing reactive mesogen is a cholesteric liquid crystal polymer which is cured to form a solid reflector. Cholesteric liquid crystal polymers are twisted structures which reflect light with a wavelength that matches the pitch of the twist. They have the advantage that the structures are polymeric and so tend to be more flexible and robust. They can be coated in a single step onto a pretreated substrate so that manufacturing costs can potentially be much cheaper and the processing can be compatible with roll-to-roll processing. However, a reflector which contains only a single layer of cholesteric liquid crystals reflects only one polarization of light. To reflect both polarizations within the design waveband, the cholesteric liquid crystals can be combined with other layers. For example, the additional layer could be another cholesteric layer in which the cholesteric polymers are twisted in the opposite sense and reflects the other polarization of light.

In an alternative embodiment, both polarizations could be reflected using a three layer solution: two cholesteric layers with the same twist polarity (also known as "chiral orientation"), with a half wave plate in between. The half wave plate changes the polarization of the unreflected light so that it can then be reflected by an underlying cholesteric layer. The half wave plate could be a stretched polymer film or could be another liquid crystal layer, in particular a reactive mesogen. The liquid crystals which make up the half wave plate could be designed to be without chiral twisting and with a thickness and birefringence suitable for half wave retardation. In some embodiments, each of these layers could be supported on a different substrate with the final reflector being formed by laminating the three substrates together. A thinner reflector and hence a thinner display can be constructed by sequentially forming the layers directly on top of each other. The underlying polymer layers form an alignment template for the next layer. This can results in a desirable alignment of reactive liquid crystals layers through the thickness of the reflector.

Throughout the specification, the term "liquid crystal" or "liquid crystal layer" is used to refer to an uncured layer of self organizing mesogenic molecules. After the liquid crystal is cured, it is referred to as a "cholesteric layer," "wave plate" or "alignment layer" according to its function and the alignment of the mesogens. To refer to cured liquid crystal layers in general, the term "mesogenic layer" is used.

Figure 1A:
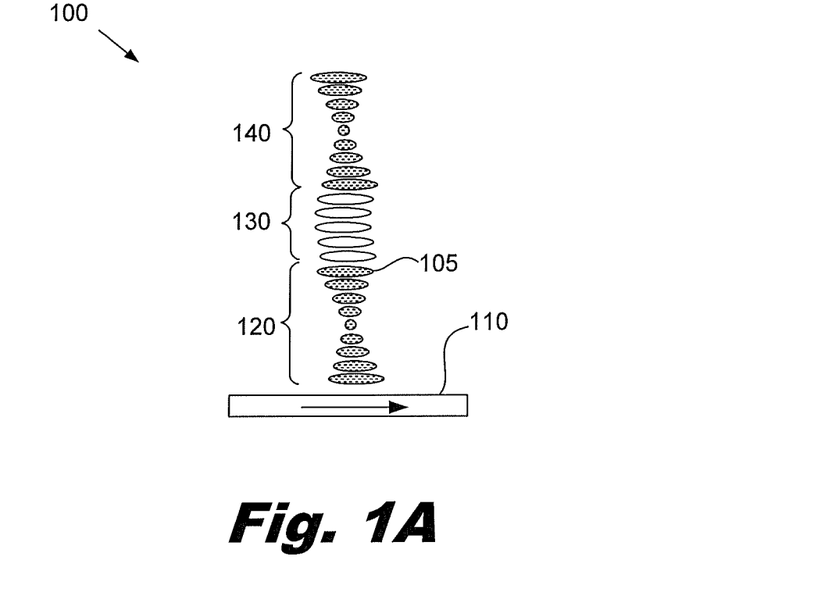
FIG. 1A is a diagram of an illustrative cholesteric reflector with an integral half wave plate, according to one embodiment of principles described herein.

FIG. 1A is a diagram of an illustrative cholesteric reflector (100) with an integral half wave plate (130). According to one illustrative embodiment, the cholesteric reflector (100) includes a substrate (110). The substrate (110) may be formed from a variety of materials. The surface of the substrate (110) may align the liquid crystal and increase the long range order of the liquid crystal over the reflector surface. For example, the substrate (110) may be coated with a rubbed polymide layer which results in a planar alignment with low pretilt.

On top of the substrate (110) the three layers of reactive liquid crystals (120, 130, 140) are deposited, with each layer being deposited directly on top of the layer beneath it. The layers (120, 130, 140) self-align with the layers below them and are then cured. This creates a reflector with a large degree of alignment through the thickness of the structure.

According to one illustrative embodiment, a lower cholesteric layer of liquid crystal (120) is deposited directly on the substrate (110). The lower cholesteric layer (120) is made up of a number of "rod-like" mesogenic molecules that are cross-linked to form a polymer (105). The shaded ovals represent the rod-like molecules (105) in various degrees of rotation, with the longest ovals representing molecules that are oriented with their major axis aligned to the left/right and the smaller ovals representing rotation of the major axis perpendicular to the plane of the page. The rotation of the molecules (105) forms a helix.

The period of the lower cholesteric layer (120) is designed to be approximately the wavelength of light that is to be reflected. The period of the lower cholesteric layer (120) is the linear distance of one complete revolution in the helix. For purposes of illustration, only one helical period is illustrated in the lower cholesteric layer (120). However, the lower cholesteric layer (120) may have any number of periods through its thickness.

In order to design the cholesteric reflector (100) to reflect light with a given wavelength, the index of refraction of the liquid crystal layers (120, 130, 140) is taken into account when calculating the wavelength of light. The index of refraction of a medium is a measure of the speed of light within that medium. The index of refraction of air is approximately 1.0 while the average index of refraction of a liquid crystal may be approximately 1.5. Consequently, the light travels significantly slower in the liquid crystal layers and wavelengths of light within the liquid crystal layers are shorter than in air. For example, red light may have a wavelength in air or a vacuum of approximately 650 nanometers. However, in the liquid crystal layers the red light is slowed and has a wavelength of approximately 430 nanometers. Consequently, a chiral liquid crystal which is designed to reflect light in the red waveband may have a period of approximately 215 nanometers.

On top of the lower cholesteric liquid crystal layer (120), a layer of birefringent liquid crystal (130) is deposited. The layer of birefringent liquid crystal (130) is not chiral but is formed from mesogenic molecules which form a planar structure. This planar layer of birefringent liquid crystals (130) is designed to act as a half wave plate which changes the polarization of light which passes through it. On top of the planar layer (130), an upper cholesteric liquid crystal layer (140) is deposited. In one embodiment, the upper cholesteric liquid crystal layer (140) has a similar period as the lower cholesteric liquid crystal layer (120).

According to one illustrative embodiment, each layer is polymerized prior to the deposition of the overlying layer. For example, the lower cholesteric layer (120) may be polymerized prior to the deposition of the birefringent liquid crystal layer to form the birefringent half wave plate (130). The birefringent liquid crystal layer may then be polymerized prior to the deposition of the upper cholesteric liquid crystal layer (140). The final polymerization of the upper cholesteric liquid crystal layer (140) produces a solid and flexible cholesteric layer. This process is further described below.

Each of the liquid crystal layers (120, 130, 140) may be formed using substantially the same process. For example, the each liquid crystal layer (120, 130, 140) may be deposited over a lower layer. This deposition may be performed in a variety of ways, including but not limited to, a slot coater, a curtain coater, a cascade coater, a blade coater, a rod coater, a gravure coater, a Mylar rod coater, a wired coater, spin coating, printing, and the like. A short bake (e.g. 1 min at 75° C.) is then used to drive off excess solvent from the liquid crystal layer and to put the liquid crystal into its isotropic phase. On cooling, the reactive liquid crystal enters a liquid crystalline phase which is aligned to the underlying layer to yield a well aligned cholesteric layer. This alignment is then cured by polymerizing the layer to form a solid cholesteric layer. By way of example and not limitation, the reactive liquid crystal layer may be polymerized by exposure to ultra violet light in a nitrogen atmosphere.

The lower and upper cholesteric layers (120, 140) reflect circularly polarized light which matches the pitch and handedness of the cholesteric layer. For example, light may include both left hand circularly polarized light and right hand circularly polarized light. A left hand cholesteric layer will reflect only the left hand circularly polarized light and transmit the right hand circularly polarized light.

Figure 1B:
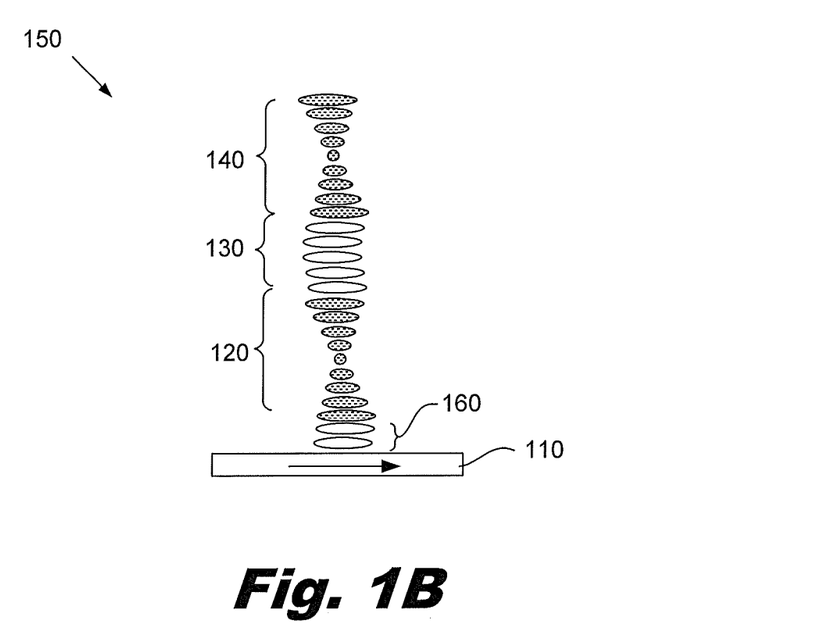
FIG. 1B is a diagram of an illustrative cholesteric reflector with a polymeric alignment layer, according to one embodiment of principles described herein.

FIG. 1B is a diagram of an illustrative cholesteric reflector (150) with an alignment layer (160) which acts as a buffer layer between the substrate (110) and the overlying layers. According to one illustrative embodiment, the alignment layer (160) can be initially deposited over the substrate (110) to smooth out defects which may be present in the substrate surface. For example, it has been discovered that a thin alignment layer (160) deposited over rubbed polymide can be used to smooth out any defects in the rubbed layer and results in more uniform alignment in the overlying layers (120, 130, 140). According to one embodiment, the alignment layer (160) does not have cholesteric structure and is cured to a solid state prior to the deposition of the next layer.

Figure 1C:
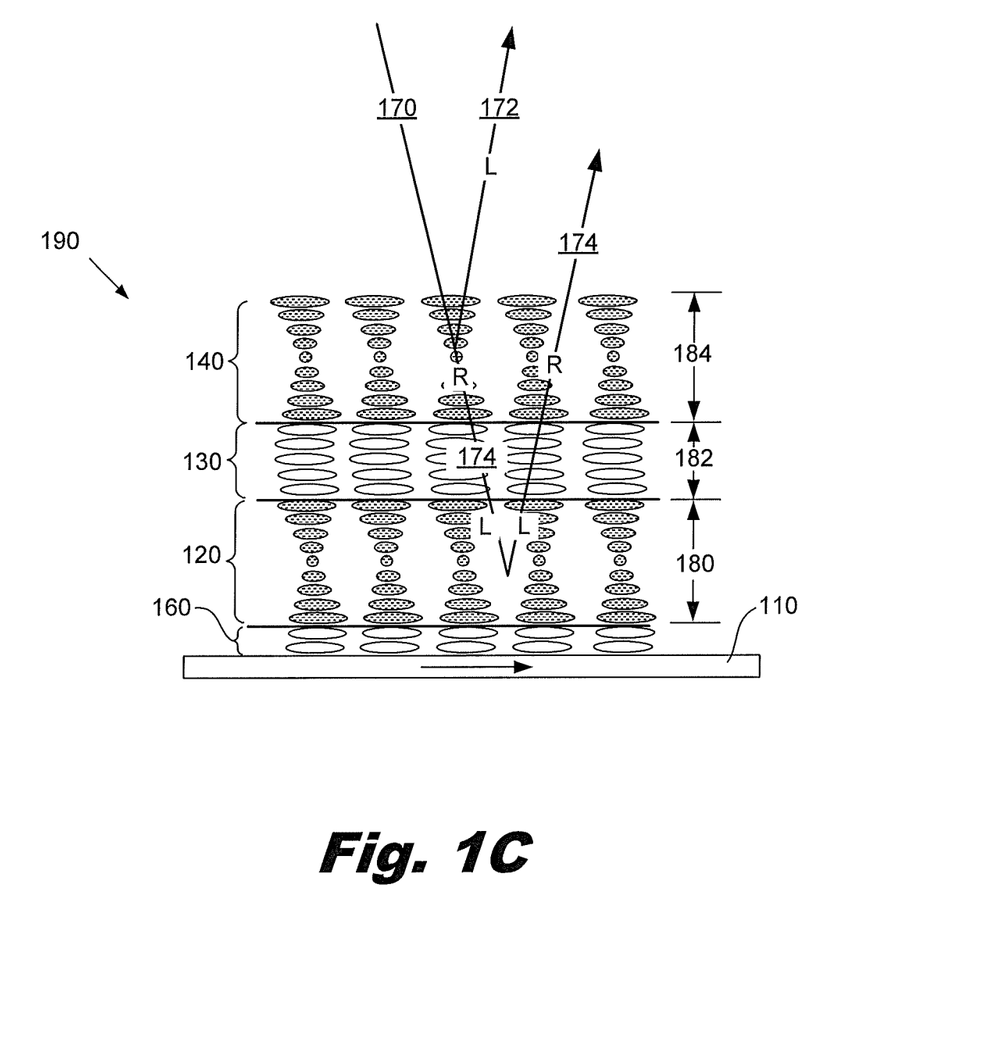
FIG. 1C is a diagram of an illustrative reflector made from coating cholesteric liquid crystal layers on a substrate, according to one embodiment of principles described herein.

FIG. 10 is a diagram of an illustrative reflector (190) made from by coating cholesteric liquid crystal reactive mesogens on a substrate (110). In this illustrative embodiment, an alignment layer (160) is first deposited on the substrate (110), followed by a lower cholesteric layer (120), a half wave plate (130) formed from a second planar liquid crystal layer and an upper cholesteric layer (140). A number of additional layers may be present in the reflective display, including protective overcoats and active layers which modulate incoming light. In this illustrative embodiment, both the lower and the upper cholesteric layers (120, 140) have a left hand chiral structure and reflect left hand circularly polarized light.

A light ray (170) is incident on the reflector (190). In this example, the light ray (170) has a wavelength or range of wavelengths which the reflector is designed to reflect (the "design waveband"). Incident light which is outside of the design waveband will not be reflected and will pass through the reflector (190). In this example, the light ray (170) has two polarization components: light with a left hand circular polarization and light with a right hand circular polarization. The wavelength of the light ray (170) is approximately the same as the pitch of the cholesteric structure. As the light ray (170) passes through the upper cholesteric layer (140), which has a left hand chiral structure, the left hand circular polarized light (172) is reflected and passes out of the reflector (190). In FIG. 1C left hand circular polarized light is labeled with an "L" and the right hand circular polarized light is labeled with an "R."

The right hand circular polarized light (174) is transmitted through the upper cholesteric layer (140) and into the birefringent half wave plate (130). As the light (174) passes into the birefringent half wave plate (130), its polarization vector is rotated so that it is left handed. Because the lower cholesteric layer (120) has substantially the same handedness and period as the upper cholesteric layer (140), this light (174) with its reoriented polarization is reflected by the lower cholesteric layer (120). The light (174) reenters the birefringent half wave plate (130) and its polarization is reoriented to a polarization which is right handed. Because the upper cholesteric layer (140) is transparent to this polarization, the light (174) passes through the upper cholesteric layer (140) and exits the reflector (190).

The overall thickness of the cholesteric reflector (190) can vary according to the specific design and target waveband. According to one illustrative embodiment, the cured thicknesses (180, 184) of the lower and upper cholesteric liquid crystal layers (120, 140) may be approximately 4 microns. As discussed above, the thickness (182) of the birefringent half wave plate (130) is dependent on a number of factors, including the birefringence of the material which makes up the layer, the wavelength of light, the order of the polarization shift, and other factors.

A number of techniques could be used to broaden the waveband which is reflected by the cholesteric reflector (190). For example, the width of the reflected waveband also depends on the birefringence of the cholesteric liquid crystal which makes up the reflective layers (120, 140). A liquid crystal with a higher birefringence can be selected to widen the reflected waveband. In another example, the reflector (190) could be formed with a variety of chiral liquid crystals which have varying periods to widen the reflected waveband.

Additionally or alternatively, additional layers with different design wavebands could be coated on top of the reflector (190). By way of example and not limitation, materials that could be used include the range of materials such as: RMS03-009 red, RMS03-008 blue, and RMS03-010 green, all produced by Merck. For the half wave plate (130) and the alignment layer (160), RMS03-001 A-plate liquid crystals, also produced by Merck, could be used.

Figure 2:
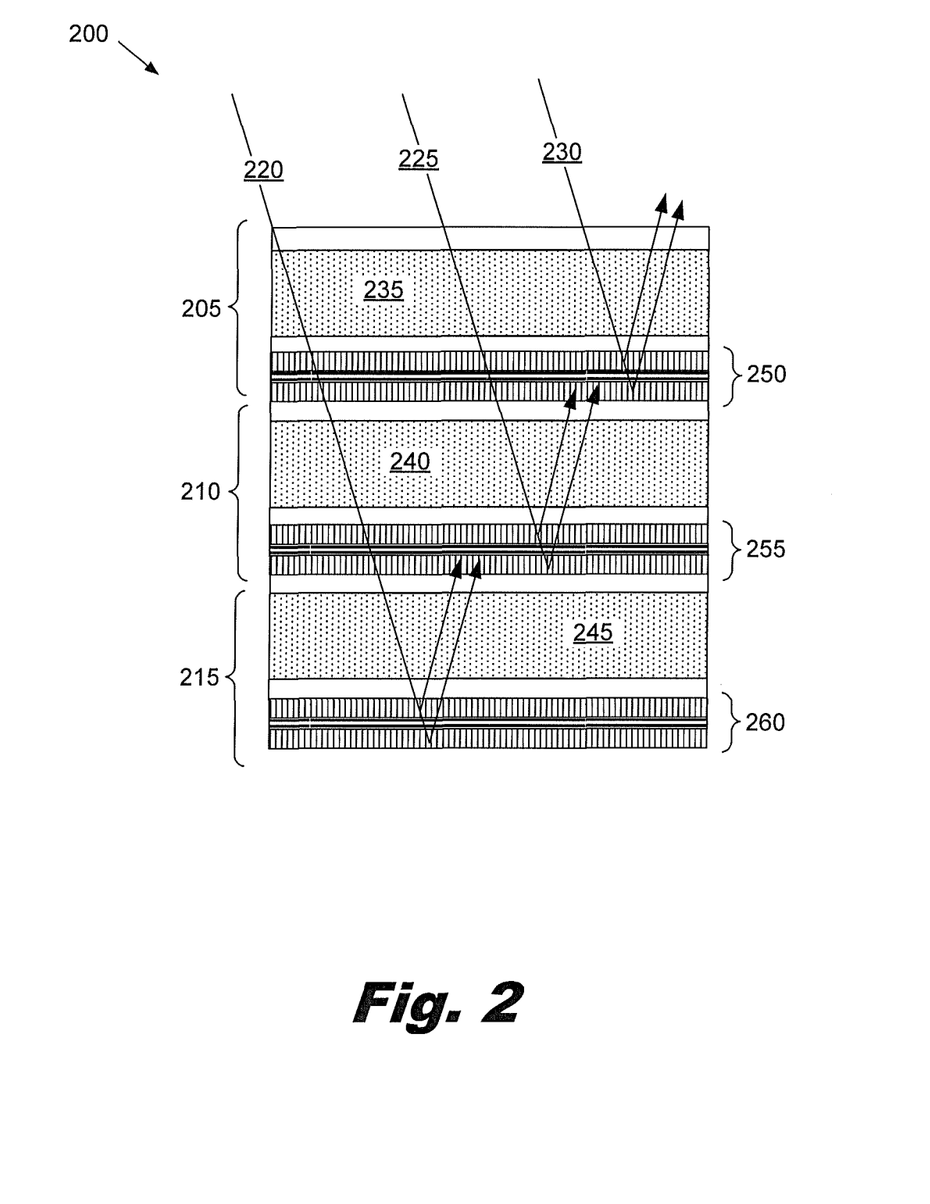
FIG. 2 is a diagram of an illustrative color display which includes stacked cholesteric reflectors, according to one embodiment of principles described herein.

FIG. 2 is a diagram of an illustrative colored display (200) which includes a number of cholesteric reflectors (250, 255, 260). According to one illustrative embodiment, the colored display (200) is made up of three cells (205, 210, 215). Each of these cells (205, 210, 215) is configured to modulate a specific design waveband (220, 225, 230) incident on the reflective display. By way of example and not limitation, the top cell (205) may be configured to modulate the red waveband (230) within the visible spectrum, while being substantially transparent to the blue waveband (225) and the green waveband (220). The middle cell (210) may be configured to modulate the blue waveband (225) while being substantially transparent to the green waveband (220) and the bottom cell (215) may be configured to modulate the green waveband (220). A wide variety of other configurations may also be used, including cyan, magenta, and yellow color schemes.

According to one illustrative embodiment, each cell (205, 210, 215) contains a modulation layer (235, 240, 245). Each modulation layer (235, 240, 245) contains a pigment which is tuned to absorb the target design wavebands (220, 225, 230) within the cell (205, 210, 215). For example, in the first cell (205), the modulation layer (235) may contain a pigment which absorbs red light (230). The modulation layers (235, 240, 245) have at least two states: an absorbing state and a transmissive state. In the absorbing state, the pigments are distributed throughout the modulation layer (235, 240, 245) and absorb incident light. In the transmissive state, the pigments are concentrated into one or more small regions of the pixel. The incident light then passes through the modulation layer (235, 240, 245) and is reflected by the underlying cholesteric reflector (250, 255, 260). This modulation and reflection occurs within a design waveband, with out-of-band light passing through the cell without significant absorption or reflection.

For example, in the absorbing state, the incident red light (230) is absorbed by the pigment in the modulation layer (235). In the transmissive state, absorption by the pigment is substantially reduced, and the majority of the light (230) passes through the modulation layer (235) and is reflected by a first cholesteric reflector (250) which underlies the modulation layer (235). As discussed above, the first cholesteric reflector (250) may include an upper cholesteric layer (140, FIG. 1A) which reflects a first polarization, a half wave plate (130, FIG. 1A) which reorients the polarization of the remaining light, and a lower cholesteric layer (120, FIG. 1A) which reflects the light with the reoriented polarization. The other wavelengths of light (220, 225) pass through the upper cell (205) and are modulated by the underlying cells (210, 215). These underlying cells (210, 215) include pigments and cholesteric reflectors (255, 260) which are tuned to a specific waveband and configured to modulate these wavebands to produce a desired image.

The modulation technique discussed above is only one illustrative example. Similar embodiments could use, for example, a guest-host liquid crystal layer incorporating dichroic dyes as the modulation element, where the dye molecules are rotated by an electric field in order to increase or reduce absorption in a specific waveband. Additionally or alternatively, electrochromic colorants could be used. Electrochromic colorants change their absorption under an electrically driven redox (reduction-oxidation) mechanism.

The example given in FIG. 2 is only one illustrative embodiment of a color reflector. A variety of different configurations could be used. For example, the bottom cholesteric reflector (260) could be replaced with a broad band reflector, such as an aluminum or silver coating. Because substantially all the light which reaches the bottom reflector (260) is intended to be reflected, a wavelength specific reflector may not be necessary. Further, if cholesteric polymers with opposite handedness are available then the quarter wave layer would be left out of each of the cholesteric reflectors (250, 255, 260). However, despite the opposite chirality of the two layers, the reflector can still be constructed such that the upper cholesteric layer (140, FIG. 1A) is aligned with the lower cholesteric layer (120, FIG. 1A). This alignment can provide a number of benefits including increased order in the upper cholesteric layer, reduced scattering, and higher reflectivity.

Figure 3:
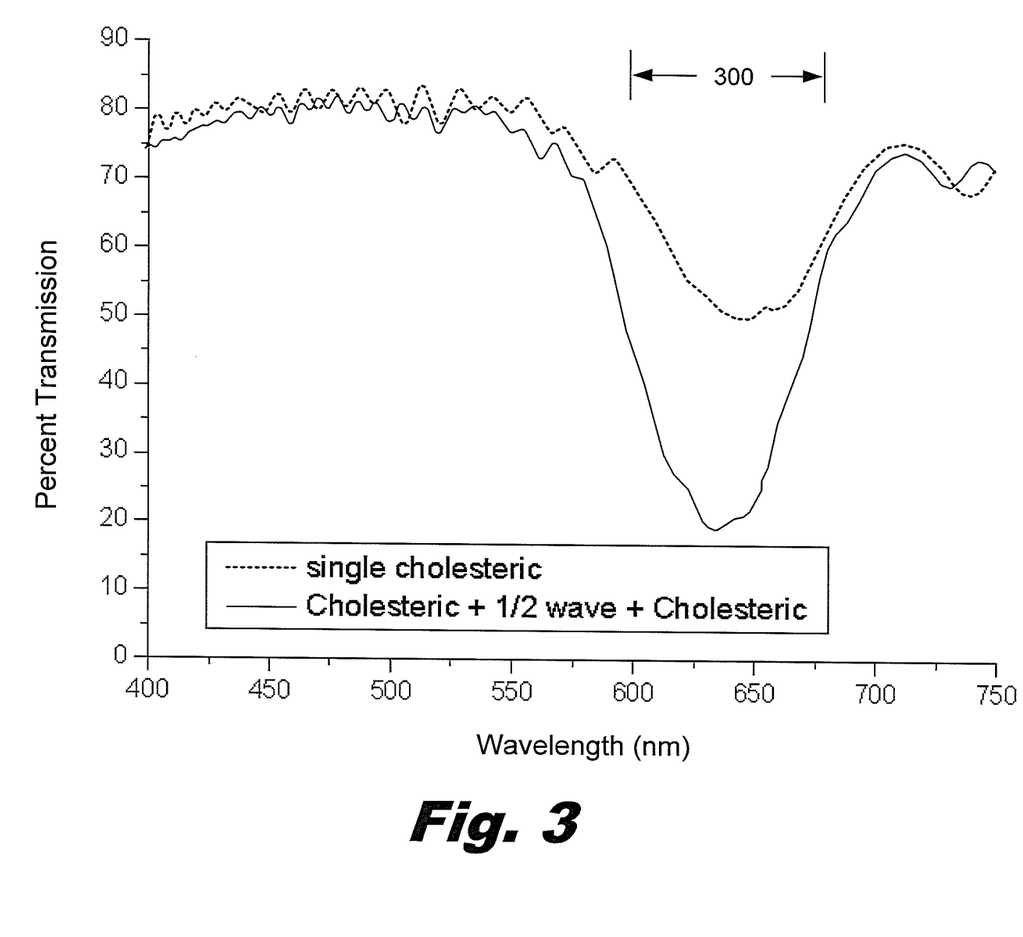
FIG. 3 is a graph of illustrative transmission curves for cholesteric reflectors, according to one embodiment of principles described herein.

FIG. 3 is a graph which shows illustrative transmission curves for two illustrative cholesteric reflectors. The vertical axis of the graph is percent transmission through the layer. For purposes of discussion, it is assumed that the reflection is equal to the difference between 100% and the measured transmission through the cholesteric reflectors. The horizontal axis of the graph is wavelength of incident light.

In this example, two different cholesteric reflectors were tested over a range of wavelengths. Both of the reflectors were tuned to reflect light in the red portion of the visible spectrum which is illustrated as a design waveband (300) on the graph. A first reflector cell included only a single cholesteric layer and, consequently, it is expected that it will only reflect one polarization of light within the design waveband (300). The transmission through the first reflector as a function of wavelength is shown by the dotted line. As can be seen from the graph, the transmission of the first reflector cell at 400 nanometers is approximately 75% to 80%. The reflector remains substantially transparent until about 600 nanometers, where the single cholesteric layer began reflecting a large portion of the light. The transmission by the single cholesteric layer of the wavelengths decreases until about 650 nanometers, then increases. The minimum transmission through the cell is approximately 50-55% which correlates to reflection of one polarization of light by the single cholesteric layer. Assuming that the incident light contained equal amounts of both polarizations of light, the maximum expected reflection by the single cholesteric layer is 50%. Consequently, the experimental results indicate that a single cholesteric layer appears to have a relatively high reflectivity for one polarization of a design waveband.

A second reflector included a three layer cholesteric reflector made up of a lower cholesteric layer, a half wave plate, and an upper cholesteric layer. The transmission through this cell is shown by a solid line. The transmission through this cell between 400 and 550 nanometers is fairly similar to the single cholesteric reflector. However, as the design waveband of 600-675 nanometers is approached, the three layer cholesteric reflector cell reflects a significantly greater amount of light. The minimum transmission through the second cell was found to be approximately 15-20%. Consequently, the experimental results show that the addition of the wave plate and cholesteric layer increased the reflection significantly at the design wavelength. The dip below 50% clearly shows that some of both polarizations of light were reflected.

Figure 4:
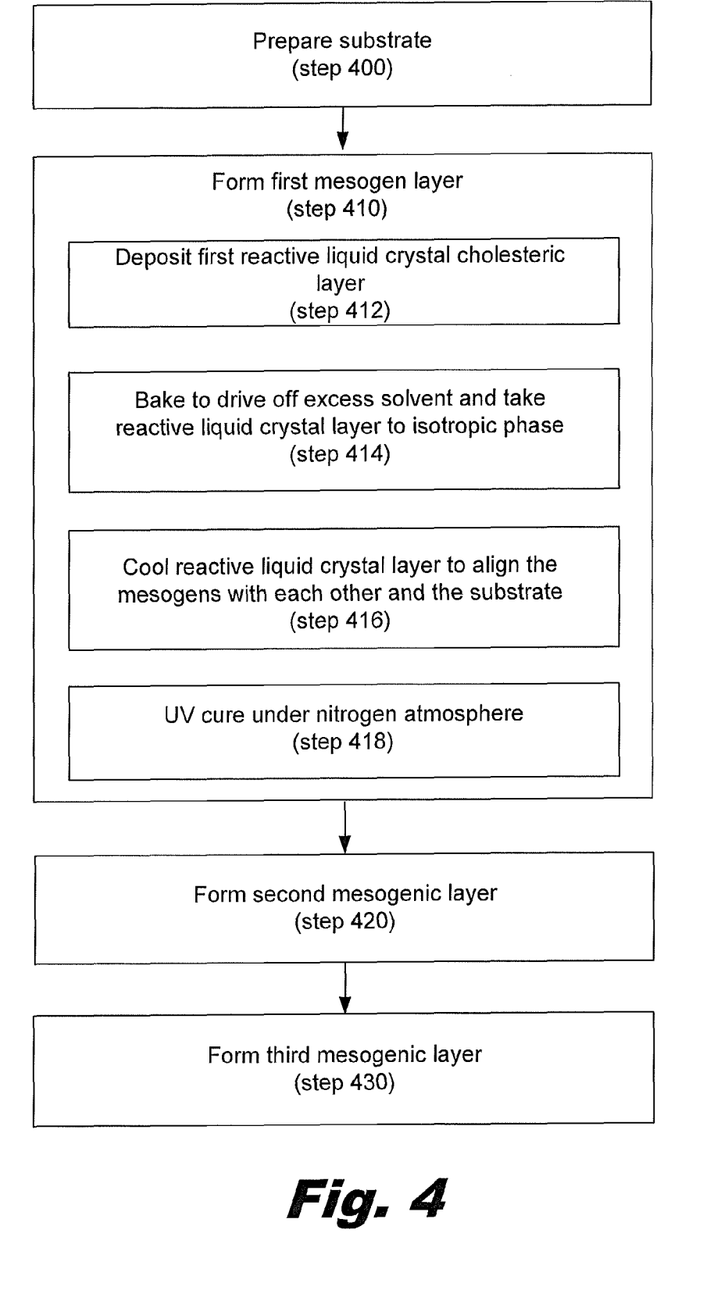
FIG. 4 is an illustrative flowchart which describes one illustrative method for constructing reflectors with cholesteric liquid crystals, according to one embodiment of principles described herein.

FIG. 4 is an illustrative flowchart which describes one illustrative method for constructing reflectors with cholesteric liquid crystals. In a first step, the substrate is prepared for deposition of the mesogenic liquid crystals (step 400). In some embodiments, this preparation may include cleaning, drying, texturing, or other steps. For example, where the substrate is coated with a polymide film, the polymide film can be rubbed to enhance the uniformity of alignment of the liquid crystal deposited onto the substrate. A variety of other substrates and preparation methods may be used. For example, sputtered silicon oxide, microstructures or photo-induced alignment layers could be used to prepare the substrate for subsequent deposition and alignment of the liquid crystal layer. Additionally, the substrate surface could be patterned or roughened, so that the subsequently coated cholesteric liquid crystal layer is perturbed from being perfectly flat, in order to achieve a diffuse reflection while still maintaining the crystalline alignment for reflection.

The first reactive mesogenic liquid crystal layer is then formed (step 410). As discussed above, the first reactive liquid crystal layer could be deposited on the substrate (step 412) in a number of ways, including: a slot coater, a curtain coater, a cascade coater, a blade coater, a rod coater, a gravure coater, a Mylar rod coater, a wired coater, spraying, spin coating, printing, and the like.

The first layer is then baked to drive off excess solvent and take the reactive liquid crystal layer to an isotropic phase (step 414). For example, the first layer may be baked at approximately 75° C. for 1 minute to drive off excess solvent. The baking time and temperature may be altered as needed for various solvents and compositions.

The reactive liquid crystal layer is then cooled to align the mesogens with each other and the underlying surface (step 416). In depositing the initial reactive liquid crystal layer, the mesogens may align with the surface texture. In following layers, the mesogens may be influenced by the upper surface presented by the underlying cured layer.

The reactive liquid crystal layer is then cured to fix the mesogens in place and form a solid mesogenic layer (step 418). For example, the reactive mesogen may be cured using ultraviolet light in a nitrogen atmosphere. Following the curing process, the mesogen layer is solid and presents a relatively ordered and uniform surface for a next mesogen layer. The cured mesogenic layer is then configured to reflect one polarization of light within a design waveband.

According to one illustrative embodiment, the second reactive mesogen cholesteric layer is then formed using steps (steps 412, 414, 416, 418) which are similar to those used above (step 420). The third reactive mesogen layer can also be formed using the same process (step 430). To form the half wave plate, a liquid crystal composition which has no twist could be deposited and cured in the same manner as described above. The process described above could be repeated for as many layers as are present within the reflector or display.

Figure 5:
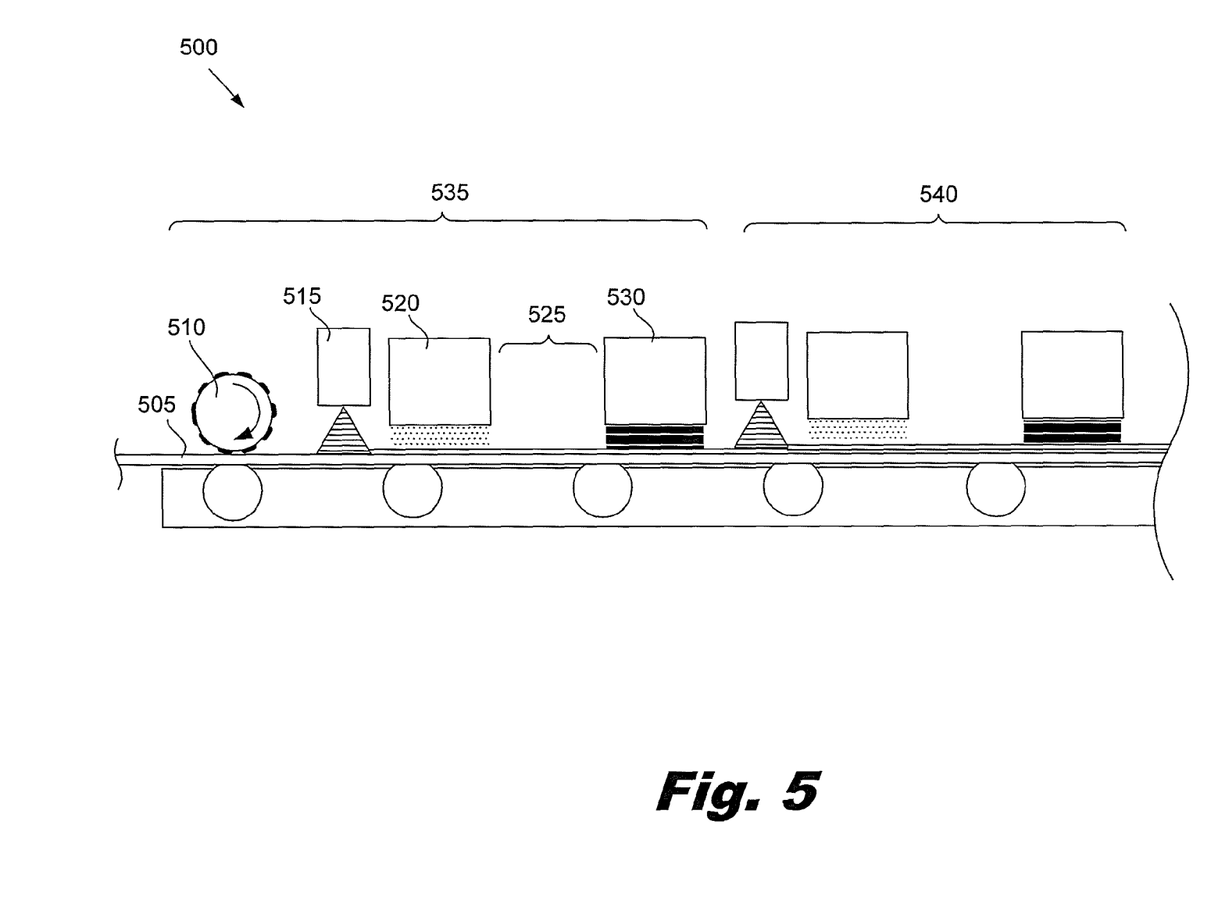
FIG. 5 is an illustrative diagram of a roll-to-roll process for constructing colored reflectors with cholesteric liquid crystals, according to one embodiment of principles described herein.

FIG. 5 is an illustrative diagram of a roll-to-roll process (500) for constructing reflectors with cholesteric liquid crystals. According to one illustrative embodiment, a sheet of substrate coated with polyimide (505) is unrolled and fed into machinery which then forms the various layers to create cholesteric reflectors. A number of other processes, steps, or procedures may be used in the roll-to-roll process to deposit or laminate other structures onto the reflectors. For clarity, these additional processes are not illustrated. Further, a roll-to-roll process is only one illustrative example of methods for constructing cholesteric reflectors. A number of other techniques could be used, including sheet by sheet construction. As discussed above, the polymide coated substrate (505) is only one illustrative example of substrates which may be suitable for the process.

A first coating process (535) may be used to deposit a first mesogenic layer on the substrate (505). In this illustrative embodiment, a first roller (510) may rub the polymide surface (505) to improve its surface texture and prepare it for deposition of the first reactive liquid crystals at the coating station (515). A variety of other techniques could be used to provide the desired level of alignment in the first layer of reactive liquid crystals. For example, photoalignment techniques may be used to align the reactive liquid crystals.

After the reactive liquid crystals are deposited onto the substrate by the coating station (515), an oven (520) bakes the liquid crystal layer to remove excess solvent. A blank section (525) allows the liquid crystals to passively cool and align. A variety of more active techniques could be used to make the cooling process more uniform and/or speed up the cooling process. For example, fans and/or passing the layer over a cooling plate could speed up the cooling process and make it more uniform. A curing unit (530) then cures the aligned liquid crystals to form the solid mesogenic layer. For example, the curing unit (530) could emit ultra violet light which polymerizes the liquid crystals to form a solid. In some embodiments, it may be desirable to limit the interaction of atmospheric oxygen and other airborne contaminates during the curing process. A nitrogen purge could be used to displace the air and reduce the number of contaminates and/or oxidizing reactions during the curing process.

A second coating process (540) can deposit the next mesogenic layer, if any. According to one illustrative embodiment, the second coating process (540) can use substantially similar equipment and steps to deposit the next layer. If additional mesogenic layers are used, the third coating process can also use similar equipment and steps. A variety of other processes and/or steps may be performed which are not illustrated in FIG. 5.

In sum, composite reactive mesogenic reflectors can be made with as few as two coating steps which are carried out at atmospheric pressure and room temperature. The process is therefore more compatible with roll-to-roll processing and could yield cheaper reflectors than conventional multilayer sputter coatings. The resulting structures are polymeric and are robust and flexible.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A cholesteric reflector comprising:
   a substrate;
   a first cholesteric layer, the first cholesteric layer being disposed over the substrate, in which the first cholesteric layer reflects a first polarization of light within a design waveband; and
   a second cholesteric layer being disposed over the first cholesteric layer, in which the second cholesteric layer reflects a second polarization of light within the design waveband;
   in which the first and second cholesteric layers are treated to substantially align the first and second cholesteric layers with a previously deposited layer; alignment of the first and second cholesteric layers with a previously deposited layer comprising aligning a number of mesogens in the first and second cholesteric layers with a number of mesogens in the previously deposited layer.

2. The reflector of claim 1, in which the handedness of the first cholesteric layer is a first chiral handedness and the handedness of the second cholesteric layer is a second chiral handedness.

3. The reflector of claim 1, in which the first cholesteric layer and second cholesteric layer have the same chiral handedness, and in which the reflector further comprises a birefringent wave plate disposed between the first cholesteric layer and the second cholesteric layer.

4. The reflector of claim 3, in which the birefringent wave plate re-orients a polarization of a light passing through it such that the light passing through the birefringent wave plate is reflected by the underlying first cholesteric layer.

5. The reflector of claim 3, in which the birefringent wave plate is a half wave plate.

6. The reflector of claim 1, further comprising an alignment layer disposed between the first cholesteric layer and the substrate in which the structure of the alignment layer is a non-chiral structure.

7. The reflector of claim 6, in which the substrate has been treated to substantially align the alignment layer.

8. The reflector of claim 7, in which the substrate is coated with rubbed polymide.

9. The reflector of claim 1, in which transmission of light in a design waveband is less than 30% through the cholesteric reflector.

10. The reflector of claim 1, in which the cholesteric reflector is substantially transparent to visible light outside of a design waveband.

11. The reflector of claim 1, further comprising:
    a third cholesteric layer to reflect a first polarization of incident light within a different design waveband; and
    a fourth cholesteric layer to reflect a second polarization of incident light within the different design waveband.

12. The reflector of claim 1, in which the reflector is disposed within a color display and in which the reflector is disposed beneath a modulation layer that modulates light within the design waveband.

13. A reflective display comprising:
    a plurality of cells, each of the plurality of cells tuned to modulate a design waveband incident on the reflective display, each of the plurality of cells comprising:
        a modulation layer tuned to modulate the design waveband; and
        an underlying cholesteric reflector tuned to reflect the design waveband, in which the cholesteric reflector comprises:
            a first cholesteric layer comprising a number of mesogens; and
            a second cholesteric layer comprising a number of mesogens;
        in which the mesogens of the first and second choleteric layers are aligned with mesogens of a previously deposited layer.

14. The display of claim 13, in which:
    the first cholesteric layer is disposed over the substrate,
    the first cholesteric layer reflects a first polarization of light within the design waveband;
    in which the second cholesteric layer is disposed over the first cholesteric layer, and
    the second cholesteric layer reflects a second polarization of light within the design waveband.

15. The display of claim 13, in which the reflective display is a colored reflective display comprising:
    a first cell to modulate a first design waveband, in which that first cell is substantially transparent to a second design waveband and a third design waveband;

a second cell to modulate the second design waveband, in which the second cell is substantially transparent to the third design waveband; and a third cell to modulate the third design waveband;

in which the second cell is sandwiched between the first cell and third cell to form the colored reflective display.

16. The display of claim 14, in which the handedness of the first cholesteric layer is a first chiral handedness and the handedness of the second cholesteric layer is a second chiral handedness.

17. The display of claim 14, in which the first cholesteric layer and second cholesteric layer have the same chiral handedness, and in which the reflector further comprises a birefringent wave plate disposed between the first cholesteric layer and the second cholesteric layer.

18. The display of claim 17, in which the birefringent wave plate re-orients a polarization of a light passing through it such that the light passing through the birefringent wave plate is reflected by the underlying first cholesteric layer.

19. A method of forming cholesteric reflector, the method comprising:

preparing a substrate for deposition of mesogenic liquid crystals; and forming a number of reactive mesogenic liquid crystal layers on the substrate, in which each of the mesogenic liquid crystal layers each reflect a different polarization of light within a design waveband; and in which forming a number of reactive mesogenic liquid crystal layers comprises aligning a number of mesogens within each mesogenic liquid crystal layer with a number of mesogens within a previously formed mesogenic liquid crystal layer.

20. The method of claim 19, in which forming a number of reactive mesogenic liquid crystal layers further comprises:

baking each reactive mesogenic liquid crystal layer to drive off excess solvent and to take the reactive mesogenic liquid crystal layer to an isotropic phase;

cooling each reactive mesogenic liquid crystal layer to align the mesogens with each other;

curing each reactive mesogenic liquid crystal layer to fix the mesogens in place and form a solid mesogen layer.

* * * * *

UNITED STATES PATENT AND TRADEMARK OFFICE
CERTIFICATE OF CORRECTION

PATENT NO.        : 8,908,131 B2
APPLICATION NO.   : 13/387101
DATED             : December 9, 2014
INVENTOR(S)       : Stephen Kitson et al.

It is certified that error appears in the above-identified patent and that said Letters Patent is hereby corrected as shown below:

In the Claims

In column 10, line 23, in Claim 8, delete "polymide" and insert -- polyimide --, therefor.

In column 10, line 52, in Claim 13, delete "choleteric" and insert -- cholesteric --, therefor.

Signed and Sealed this
Ninth Day of June, 2015

Michelle K. Lee
*Director of the United States Patent and Trademark Office*